United States Patent
Payne et al.

(10) Patent No.: US 7,916,667 B2
(45) Date of Patent: Mar. 29, 2011

(54) METHOD FOR DETECTING RF LINK IMBALANCES IN A WIRELESS COMMUNICATIONS NETWORK

(75) Inventors: Steven John Payne, Chippenham (GB); Stuart John Irving, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 878 days.

(21) Appl. No.: 11/824,139

(22) Filed: Jun. 29, 2007

(65) Prior Publication Data

US 2009/0003272 A1    Jan. 1, 2009

(51) Int. Cl.
*H04L 12/28* (2006.01)
*H04B 7/005* (2006.01)
*H04Q 7/00* (2006.01)

(52) U.S. Cl. .................. 370/255; 370/278; 370/328

(58) Field of Classification Search .............. 370/254, 370/255, 278, 282, 328
See application file for complete search history.

(56) References Cited

U.S. PATENT DOCUMENTS

| 5,542,097 | A * | 7/1996 | Ward et al. .............. 455/437 |
| 6,785,249 | B2 * | 8/2004 | Soliman .................. 370/335 |
| 6,920,123 | B1 | 7/2005 | Shin et al. |
| 6,950,417 | B2 * | 9/2005 | Soliman .................. 370/335 |
| 2002/0077141 | A1 * | 6/2002 | Hwang et al. ........... 455/522 |
| 2003/0210668 | A1 * | 11/2003 | Malladi et al. ......... 370/335 |
| 2004/0097223 | A1 | 5/2004 | Bellec et al. |
| 2005/0143118 | A1 * | 6/2005 | Bernhardsson et al. ... 455/522 |
| 2007/0010253 | A1 * | 1/2007 | Gunnarsson et al. .... 455/442 |
| 2007/0197253 | A1 * | 8/2007 | Watanabe et al. ....... 455/522 |
| 2008/0069028 | A1 * | 3/2008 | Richardson ............. 370/328 |
| 2008/0123601 | A1 * | 5/2008 | Malladi et al. ......... 370/335 |

* cited by examiner

Primary Examiner — Hong Cho
(74) Attorney, Agent, or Firm — Fay Sharpe LLP

(57) ABSTRACT

A method for determining an RF link imbalance between an Uplink Path and a Downlink Path of an RF Link formed between a User Equipment (UE) and a Node in a wireless network is provided. The method includes determining the UE receive power levels and the UE transmit power levels for the RF Links at the UE side of the radio interface and identifying one or more RF Links having $AvgSum_{Tx+Rx}$ values deviating from the $AvgSum_{Tx+Rx}$ values of other RF Links, as one or more RF Links having an RF Link imbalance.

16 Claims, 6 Drawing Sheets

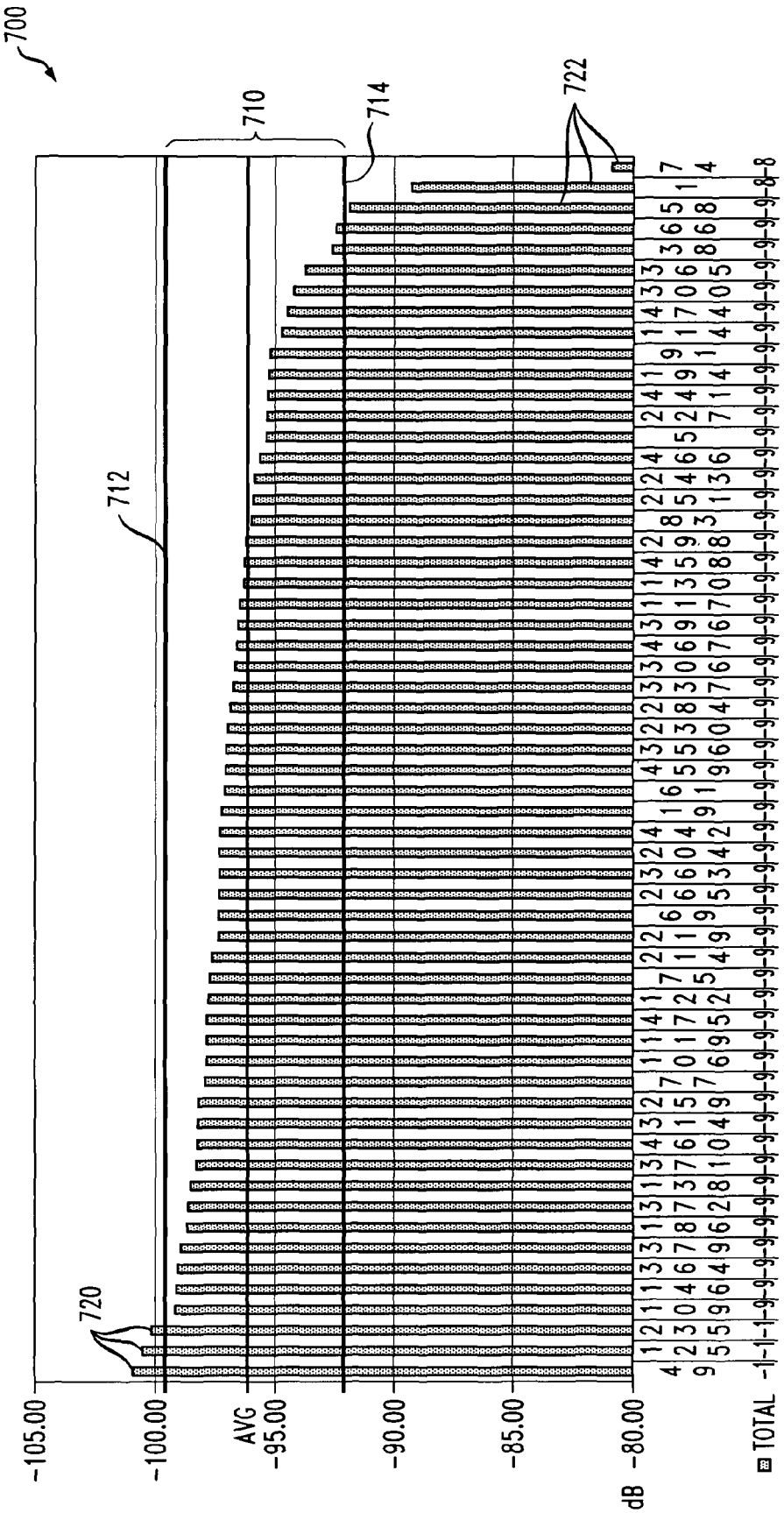

METHOD FOR DETECTING RF LINK IMBALANCES IN A WIRELESS COMMUNICATIONS NETWORK

BACKGROUND OF THE INVENTION

This invention relates detecting RF link imbalances and more particularly to a method for determining RF link imbalances from the User Equipment side of the Air Interface.

While the invention is particularly directed to the art of 3 G UMTS wireless networks, and will be thus described with specific reference thereto, it will be appreciated that the invention may have usefulness in other fields and applications.

Wireless communications networks, also referred to as cellular networks, provide users with mobility while communicating by using a plurality of Base Stations, also referred to as NodeBs, each covering different geographic areas, known as Sectors and/or Cells. The user's Mobile Terminal, also referred to as User Equipment, communicates with one or more NodeBs via RF Links established over Air Interfaces, also referred to as RF Interfaces. The UE transmits information to the NodeBs via Uplinks (UL) and receives information from the NodeBs via Downlinks (DL). Each Base Station is designed to send and receive wireless traffic for multiple Circuit Switched and Packet Switched clients over these RF Links.

3 G UMTS networks are configured with the intention that the RF Link is subject to similar losses in both the UL and the DL. However it is sometimes the case that UL and DL losses are not equal, for instance this situation is commonly seen when a site has incorrect provisioning of external amplifiers or when component faults introduce additional attenuation to one side of the RF path. Such a discrepancy between UL and DL paths is generally described as a "Path Imbalance", or RF Link Imbalance, or Link Imbalance, and if the imbalance is large enough it can have a serious impact on call performance and stability.

Symptoms of Link Imbalance may include (but are not necessarily limited to: unreliable access or no access to the Network by the mobile terminal, power overshoots, power undershoots, degraded call performance, radio link failures, increased signaling due to link state toggling, and loss of radio link diversity gains.

Although Link Imbalance can have serious consequences it presents some challenges to identify. From the Network side of the air interface, measurements and alarms are not available to highlight this problem without complicated correlation of measurements from the mobile terminal and the Network. Due to this complexity it is not usual to proactively look for errors and, as such, they can go unnoticed for some time. Even if the relevant trace is available, investigation by skilled Network engineers is generally necessary to analyze the results. Needles to say, this procedure is time consuming and potentially inaccurate.

Whenever a call is active the UE can have one or more radio links established between single or multiple nodeB's. When the number of radio links is greater that one, the UE is said to be in Handover (HO). As the UE moves within the Network, radio links between the UE and nodeB(s) will be created and deleted in order to maintain the best combination of links for optimal call performance and stability.

For efficient use of nodeB and UE resources the links in both the UL and DL directions implement a known Power Control Mechanism. The Power Control Mechanism optimizes the amount of power used in each direction by relying on independent feedback mechanisms to continually instruct the other end of the RF Link to increase power, that is "power up", or decrease power, that is "power down". If more than one link exists between a UE and the network the UE may have conflicting instructions from different NodeB's to adjust its power. The UE will give priority to any instruction to power down and in this way the minimum required Tx power can be maintained in each direction based on the requirements of the "best" link.

In order to make the decision to add a new link, the Network requires the UE to provide reports based on Quality measurements made for the DL path. Therefore a report indicating that the DL is at a level suitable for adding may instigate a HO procedure. Ideally the UL and DL paths experience similar losses for all nodeB's, so once a HO procedure occurs the relative UL and DL power levels required for all links will be comparable. However if a Link Imbalance exists the UL will be either stronger or weaker in relation to the DL by an amount equal to the imbalance for one of the links.

If the UL is Stronger than expected and the losses in this direction are lower, the nodeB providing this link will instruct the UE to power down until it achieves the optimal Signal to Interference ratio (SiR). This will ultimately lead to the other links in the set experiencing a drop in receive level and consequently SiR. This situation in turn may result in non-optimal performance for the call and failure of the redundant links.

If the UL is Weaker than expected the opposite may occur, that is, the other links in the set will be stronger in the UL and indicate for the UE to power down, while the newly added link may need the power to increase. In this situation the new link will experience poor performance or link failure.

Another consideration when understanding the need to identify RF Link Imbalance is the affect of this issue on 3 G High Speed Downlink Packet Access (HSDPA) calls. For this type of call there is increased impact due to reliance on a single primary link in the set, referred to as the Serving Cell Link. Unlike R99 based calls, HSDPA relies on the use of UL signaling, referred to as HS-DPCCH, directed towards the Serving Cell and this channel has no redundancy across the different radio links between the UE and the Network. Therefore if the primary link degrades or fails, then the HS-DPCCH signaling will also degrade or fail with no possibility of recovering the data from other links in the set. This can result in very poor DL data performance for HSDPA and also the potential for call interruptions depending on the mechanisms implemented for link failure recovery.

The present invention contemplates a new and improved method for detecting RF Link imbalances that resolves the above-referenced difficulties and others.

SUMMARY OF THE INVENTION

A method for detecting RF link imbalances between in a wireless communications network is provided. In one aspect of the invention the method includes establishing RF Links at different locations within the network, each RF link including an UL_Path and a DL_Path between a UE and one or more Nodes in a wireless network, determining the UE receive power levels (UE_Rx) and the UE transmit power levels (UE_Tx) for the RF Links, determining the sums ($Sum_{Rx+Tx}$) of UE_Rx and UE_Tx for the RF Links, collecting sets of one or more $Sum_{Rx+Tx}$, each set corresponding to a different RF Link, determining the averages ($AvgSum_{Rx+Tx}$) of the $Sum_{Rx+Tx}$ values for each set, identifying one or more RF Links having $AvgSum_{Tx+Rx}$ values deviating from the $AvgSum_{Tx+Rx}$ values of other RF Links, as one or more RF Links having an RF Link imbalance.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 7 is a plot of the Averages of Sums of UE transmit power levels and UE receive power levels used for detecting RF Link Imbalances.

DETAILED DESCRIPTION OF THE PREFERRED EMBODIMENTS

The system and methods described in this submission enables the identification of RF Link Imbalance on a specific Cell Site using a "novel" well-defined and reliable method. Furthermore this method does not require any detailed knowledge of underlying procedures and can be applied manually by a technician or engineer. Significantly it can also be incorporated in to diagnostics tools for automatic identification using existing drive test metrics.

Figure 1:
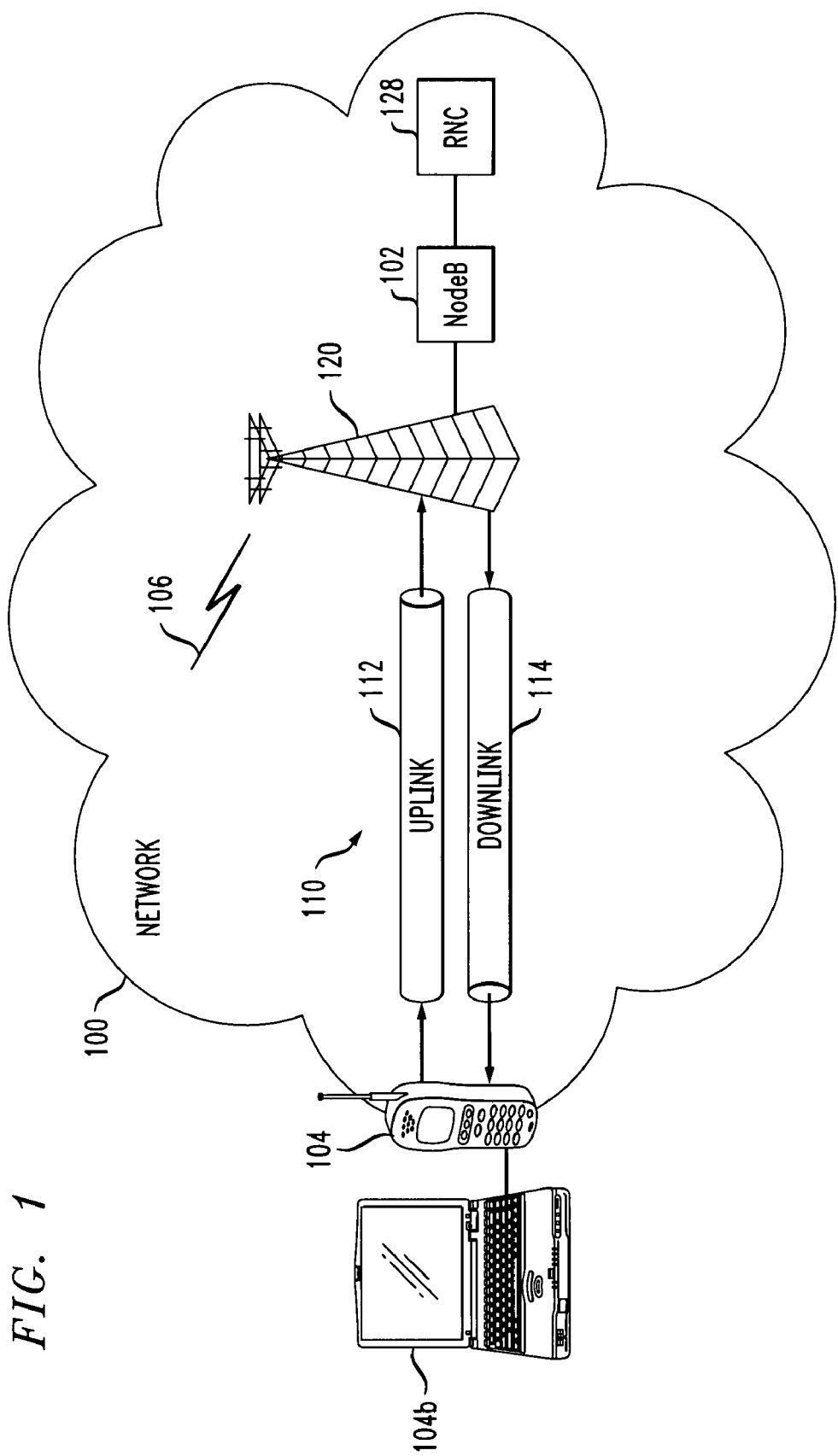
FIG. 1 is a block diagram illustrating a communications network including a system for practicing aspects of the present inventive subject matter.

Referring now to the drawings wherein the showings are for purposes of illustrating the preferred embodiments of the invention only and not for purposes of limiting same, FIG. 1 provides a view of the overall preferred system according to the present invention. As shown in FIG. 1, a portion of a wireless communications network for providing mobile or cellular calling is shown generally at 100. The network 100 includes a plurality Base Transceiver Stations (only one of which is shown for simplicity at 102), also known as NodeBs, providing wireless communication between User Equipment (UE) 104 and the network 100 over an Air Interface, also known as a Radio Interface 106. The UE 104 can include devices such as mobile phones, also referred to as mobile terminals, and computers with wireless communications connectivity, etc. The UE can also be a testing device 104b capable of establishing an RF link with NodeBs for testing the quality of RF Links similar to those established between NodeB and UE when making calls over the network.

The wireless communications network can be a Universal Mobile Telecommunications System (UMTS) network utilizing a W-CDMA air interface, though the method described herein can be applicable to other wireless networks including but not limited to ITU IMT-2000 networks, among others. The NodeB forms part of a Base Station Subsystem (BSS) and has equipment such as transceivers for transmitting and receiving of radio signals to and from the UE on RF Links, one of which is shown at 110. The RF link includes an Uplink (UL) 112 used for sending radio signals from the UE to the NodeB and a Downlink (DL) 114 used for sending radio signals from the NodeB to the UE. The BSS can also include Antennas 120, Signal Processors, Signal Amplifiers, and equipment for system management including one or more Power Control Mechanisms which based on the needs of the receiver communicate power management commands to the UE in order to achieve a target Signal to Noise ratio for the UL transmission. For a UMTS R99 Voice Call this involves dedicated power management for each served UE and the subsequent transmission of Power Up or Power Down commands from the NodeB to each UE. The network 100 can also include one or more Radio Network Controllers (RNC) 128 The RNC provides control functionalities for one or more Node Bs. A Node B and an RNC can be the same device, although typical implementations have a separate RNC located in a central office serving multiple Node B's.

It has been found that for a wireless communications system with known operating specifications, simple addition of the UE Rx and Tx powers during an active call will produce a near constant value independent of the position of the UE. Moreover the value produced is intrinsically linked to the difference between the UL_Path_Losses and DL_Path_Losses, therefore direct comparison of the sum of the recorded values with either a calculated reference, or a data set average, enables RF link imbalance to be detected and the magnitude estimated.

The method described herein is based on this simple calculation and requires only measurements taken from the UE side of the Air Interface. These measurements combined with well-known network parameters provide a proven method for determination of link imbalance.

Figure 2:
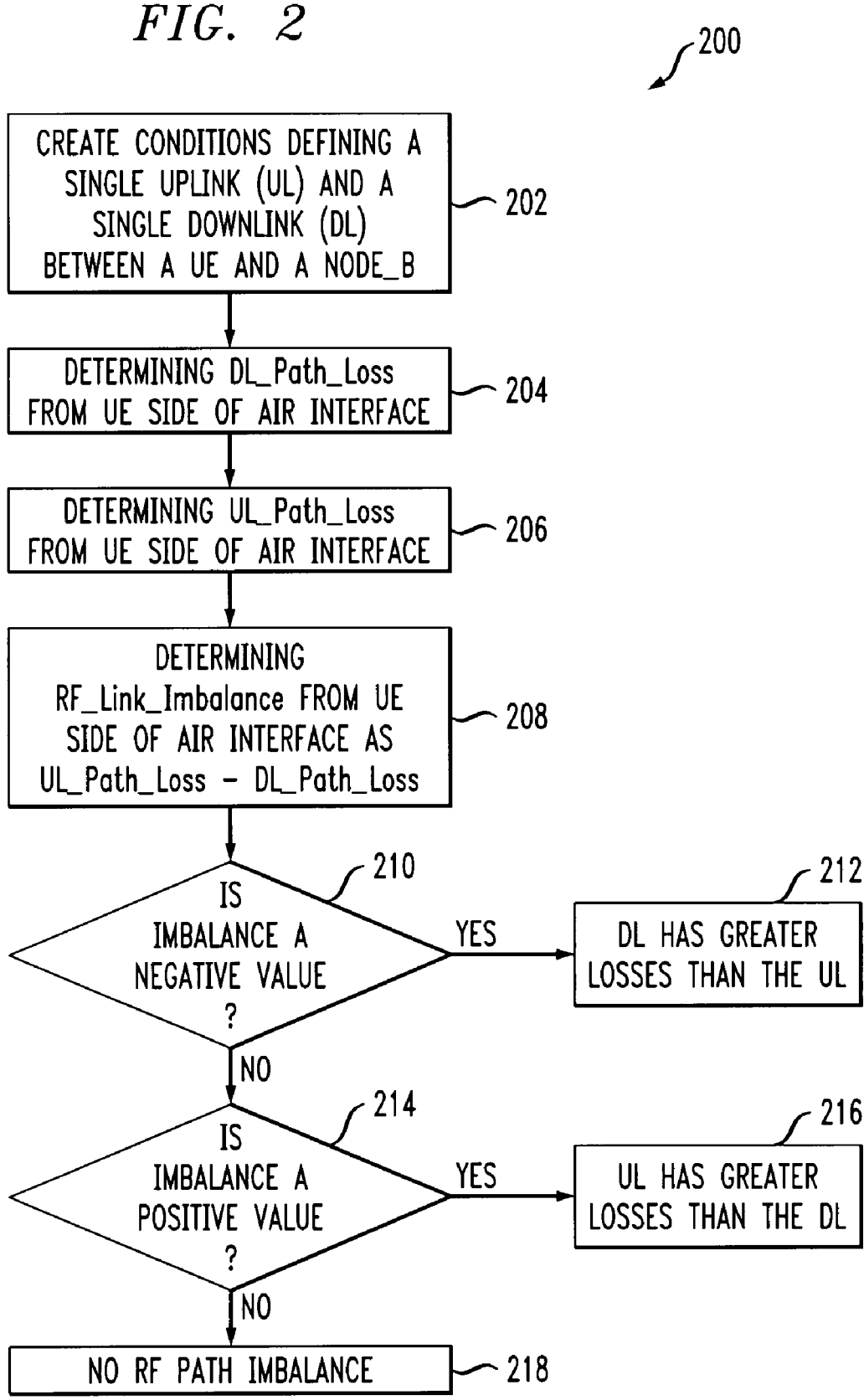
FIG. 2 is a flow chart illustrating a method in accordance with the present invention.

Referring now to FIG. 2, a method for determining an RF link imbalance between an Uplink and a Downlink between a UE and a NodeB from the UE side of the Air Interface (Uu) is shown generally at 200. Basic principles of the path loss scenario are explained showing how it is possible to estimate both the UL_Path_Loss and DL_Path_Loss from measurements made on the UE. Further, it is possible to simply compare the UL to DL losses in order to determine the direction and magnitude of an imbalance.

The method 200 includes creating conditions defining a single UL and a single DL between a UE and a NodeB at 202. This can be accomplished by making a Voice call from the UE in a location with only a single link, including an UL path and DL path, between the UE and the nodeB under test. These conditions can be created by making the call in a location where the UE is not in Handover during which multiple UL and DL may be created. Alternatively, historic data generated from one or more previous calls may be used instead of making a call in real time. The historical data can be filtered to retain only data where a single link exists, including an UL path and a DL path, between the UE and the NobeB suitable for determining the link imbalance as described herein.

Figure 3:
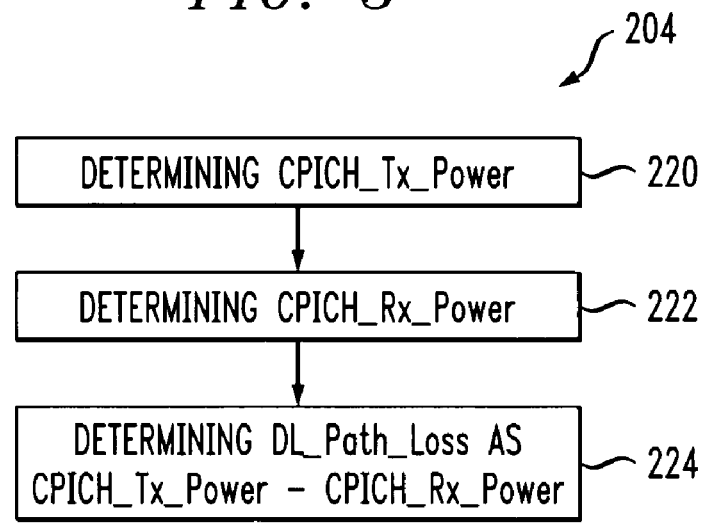
FIG. 3 is a flow chart illustrating a method in accordance with the present invention

The method 200 also includes determining the DL_Path_Loss from the UE side of the Air Interface at 204. Referring now to FIG. 3, the DL_Path_Loss can be determined using the Common Pilot CHannel (CPICH) broadcast made by the NodeB. It is common for each Cell in the Network to transmit the CPICH broadcast at a known power level, referred to herein as CPICH_Tx_Power. The method 200 includes determining the CPICH_Tx_Power at 220. For each NodeB, the CPICH_Tx_Power is typically fixed and the value is signaled to the UE via System Information Broadcasts in a known manner. This value is used as the CPICH_Tx_Power. Since the value of CPICH_Tx_Power rarely changes for a particular cell, it can also be obtained in advance, such as from system configuration parameters during step 220. System Information Broadcast 5 (SIB5) contains mandatory IE Primary CPICH TX power.

The method 200 also includes determining the CPICH receive power, referred to as CPICH_Rx_Power, at 222. The CPICH_Rx_Power value can be measured at the UE using standard diagnostic/data collection tools, such as for example Software based TEMS, CAIT or AGILENT tools. These tools are PC based and collect data directly from UE devices. Alternatively, the CPICH_Rx_Power can be obtained from historical data collected from measurements made at the UE.

The DL_Path_Loss can then be determined at 224 by comparing the signaled value, or known value obtained as described above, for CPICH_Tx_Power with the CPICH_Rx_Power, either measured at the UE or obtained from historical data as described above. More specifically DL_Path_Loss is then determined from the difference of these values, CPICH_Tx_Power minus CPICH_Rx_Power. As an example, which should not be considered limiting, for a CPICH Tx power of 36 dBm, and the a measured Rx value at the UE −64 dBm, the DL_Path_Loss in this case is:

$$DL\_Path\_Loss = CPICH\_Tx\_Power - CPICH\_Rx\_Power$$
$$= 36 - (-64)$$
$$= 100 \text{ dBm}$$

The DL_Path_Loss may vary with time and depends on the UE's position in the network, but it is expected that the UL_Path_Loss will vary by approximately the same amount.

Referring again to FIG. 2, the method 200 further includes determining the UL_Path_Loss from the UE side of the Air Interface at 206. This step is preferably performed closely in time to determining DL_Path_Loss in step 204, either simultaneously with, or nearly so, to assure their correlation. Measurements taken from data collection equipment such as the tools described previously are time synchronized and, as such, provide optimal data points for calculating coincident UL and DL losses.

Figure 4:
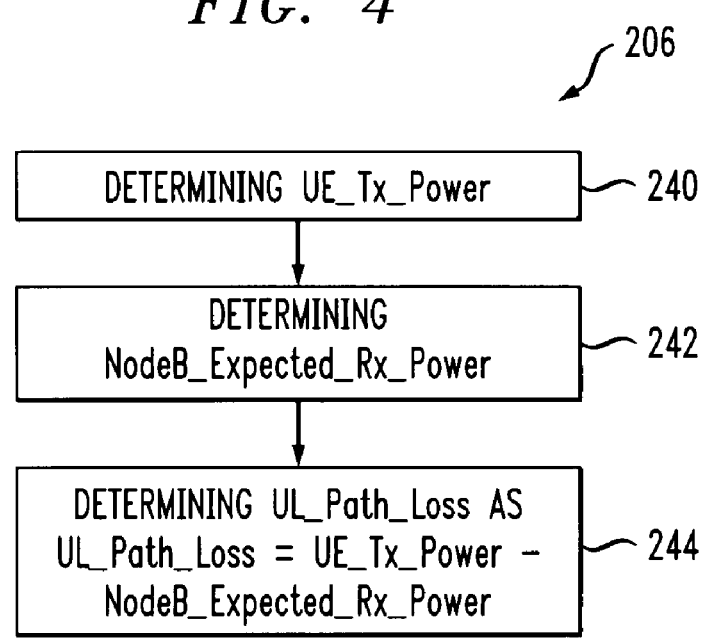
FIG. 4 is a flow chart illustrating a method in accordance with the present invention.

Referring now to FIG. 4, the determination of UL_Path_Loss in 206 is shown in further detail. Step 206 includes measuring the UE transmit power, referred to as UE_Tx_Power, at 240, using known devices or techniques at the UE.

The determination of UL_Path_Loss also includes determining, at 242, the power expected to be received at the NodeB from the UE transmission, referred to as the NodeB_Expected_Rx_Power. In the UL there is no fixed reference power which can be obtained from the UE and yet it is desirable to take measurements from the UE side of the Air Interface only. This would seem to make it impossible to calculate the UL loss from UE measurements alone.

However, a known Power Control Mechanism will be active on both the UL and DL paths when a call is in place. Therefore by considering the UL path power control it is possible to calculate an approximate UL path loss by comparing the UE_Tx_Power with the NodeB_Expected_Rx_Power. This is possible because in a correctly configured system, the Power Control Mechanism will adjust the UE_Tx_Power such that it maintains the Rx power at the NodeB at a level above the Noise Floor by a target amount.

As an example, which should not be considered limiting, using known values for the expected Noise Floor of the system (such as using measured values, market averages, or values broadcast in SIB7), the Receive Sensitivity on the Network side (which can be taken from the equipment specification), the Processing Gain of a voice call (which can be determined from the Spreading Factor), and the approximate target Signal to Interference ratio (such as using typical known values), the target power (NodeB_Expected_Rx_Power) can be closely estimated as:

Noise Floor=−108 dBm

NodeB Rx Sensitivity=−128 dBm

Voice Call Processing Gain=25 dB

Approximate SiR=6 dB

This gives an approximate target RX level at the NodeB of:

$$NodeB\_Expected\_Rx\_Power = -108 - 25 + 6 = -127 \text{ dBm}$$

For a given network system it can be assumed that the Noise Floor is similar for all locations, and although the level may change, such as for example due to cell loading, it is expected that this should not be significant. Indeed a large deviation from the expected value for the Noise Floor can be a cause imbalance and could therefore be discovered by the methods described herein. If necessary more accurate readings may be taken by selecting measurements when the cell is lightly loaded. The actual target level can be obtained through theoretical estimation, and/or confirmed through study of network measurements.

The UL_Path_Loss can then be determined at 244 from the difference between the UE_Tx_Power, determined at 240, and the NobeB_Expected_Rx_Power, determined at 242. As an example, it can be seen:

$$UL\_Path\_Loss = UE\_Tx\_Power - NodeB\_Expected\_Rx\_Power$$
$$= -27 - (-127)$$
$$= 100 \text{ dBm}$$

Referring again to FIG. 2, the RF_Link_Imbalance is then determined from the UE side of the Air Interface at 208 as the difference between UL_Path_Loss (determined at 204) and the UL_Path_loss (determined at 206). In the example provided, the RF Link Imbalance can be stated as:

$$RF\_link\_imbalance = UL\_Path\_Loss - DL\_Path\_Loss$$
$$= 100 - 100$$
$$= 0$$

The method 200 uses three basic calculations that can be applied from transmit and receive measurements taken at the UE using known parameters:

An example illustrating the determination of a path imbalance of 15 dBm, can be shown as:

1. $DL\_Path\_Loss = CPICH\_Tx\_Power - CPICH\_Rx\_Power$
$$= 36 - (64)$$
$$= 100 \text{ dBm}$$

-continued

2. UL_Path_Loss = UE_Tx_Power − NodeB_Expected_Rx_Power
= 42 − (−127)
= 85 dBm

3. RF_link_imbalance = UL_Path_Loss − DL_Path_Loss
= 85 − 100
= −15 dBm

The results of the RF path imbalance determined in step 208 give a negative value, which as determined at 210, indicates at 212 that the DL path has higher losses than the UL path by 15 dBm. A positive value as determined at 214 would indicate at 216 that the UL path has greater losses than the DL. As shown at 218, no RF path imbalance exists if a value of zero is obtained at 208.

This method 200 can be applied manually by using instantaneous measurements taken at the UE. The method 200 can also be performed using suitable algorithms for accomplishing these measurements incorporated into existing data collection applications. In this way the Tx and Rx levels can be continuously monitored and calculated imbalance can be determined and displayed in real time.

Since the method 200 for determining RF path imbalance relies on some values which remain constant within the network, it is possible to simplify the method further to allow imbalance detection using comparisons with an expected target.

For a correctly working network it can be expected that the UL_Path_Loss and DL_Path_Loss should be equal:

UL_Path_Loss=DL_Path_Loss

As described above, if the DL_Path_Loss and UL_Path_Loss are calculated as:

DL_Path_Loss=CPICH_Tx_Power−CPICH_Rx_Power

UL_Path_Loss=UE_Tx_Power−NodeB_Expected_Rx_Power then, for a balanced RF link:

(UE_Tx_Power−NodeB_Expected_Rx_Power)=
(CPICH_Tx_Power−CPICH_Rx_Power)

which can be stated as:

UE_Tx_Power+
CPICH_Rx_Power=CPICH_Tx_Power+NodeB_Expected_Rx_Power

Substituting the values for the CPICH_Tx_Power and NodeB_Expected_Rx_Power, which are typically known for the network system and do not vary, this reduces to:

UE_Tx_Power+CPICH_Rx_Power=36+(−127)

UE_Tx_Power+CPICH_Rx_Power=−91

Therefore, for a balanced system, it can be seen that the addition of the UE_Tx_Power and the CPICH_Rx_Power should add up to a value equal to the difference between the CPICH_Tx_Power and the NodeB_Expected_Rx_Power. However, given that these parameters should be constant throughout the network it is not necessary to know their actual values. Instead a direct comparison of the sums of the UE receive power levels (UE_Rx) and the UE transmit power levels (UE_Tx) can be used to determine RF Link imbalance conditions by detecting significant deviations from the expected well balanced transmit and receive power values. This can be obtained either from the study of network data, or based on a data set average for the current set of results.

This comparison is possible because any relative imbalance will result in the UE transmitting at a lower or higher power by an amount equal to the imbalance, however the DL_Path_Loss will then be seen equal to the UL_Path_Loss plus any change of loss due to imbalance.

Figure 5:
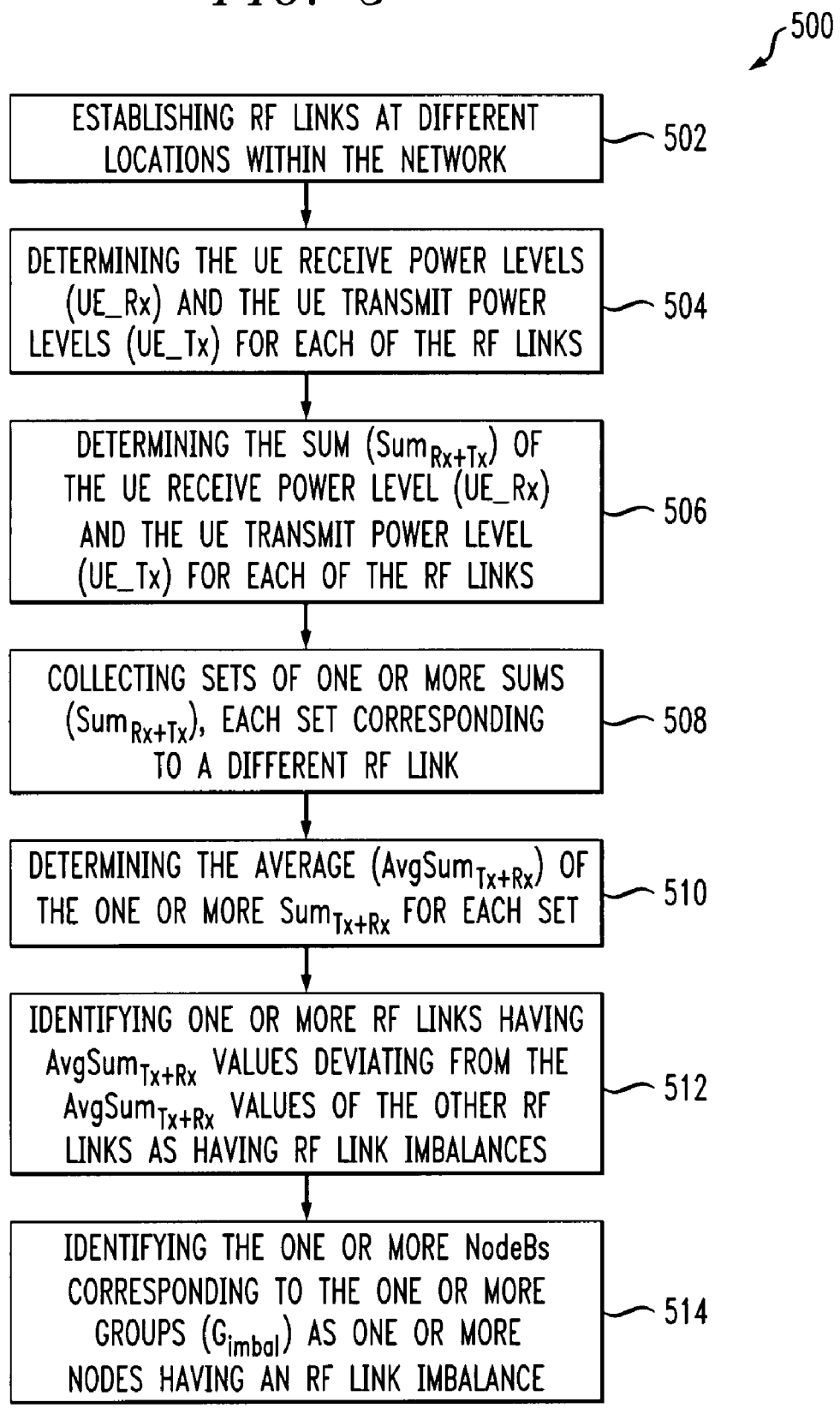
FIG. 5 is a flow chart illustrating a method in accordance with the present invention.

Referring now to FIG. 5, an alternate embodiment of a method of determining an RF link imbalance between an Uplink Path (UL_Path) and a Downlink Path (UL_Path) of an RF Link between a User Equipment (UE) and a NodeB in a wireless network, such as a 3 G UMTS network is shown generally at 500. The method 500 includes establishing RF Links at different locations within the network at 502. Each RF link includes an UL_Path and a DL_Path between a UE and a NodeB. The RF Links created at 502 are the same as, or similar to, those generated when a UE is making a typical Voice Call. In the example provided herein, which should not be considered limiting, the determinations are based on using power measurements from a UE engaged in a R99 Circuit Switched Voice Call. The type of call is defined enabling the determination of the Processing Gain of the call which is based on the UL Spreading Factor (SF). The UL SF for a voice call, and hence the Processing Gain, is then known. In addition specifying the Call type makes comparison of results possible when comparing Network averages in the simplified calculation keeping the measurement criteria constant. It can be said RF Links for a Voice Call with approximately a 100% voice activity factor would be an ideal reference, though Voice Call Links having other voice activity values can be used.

The RF Links can correspond to different sectors and/or cells and/or NodeBs of the wireless network. The links, and data obtained therefrom, can be established during a testing cycle proceeding directly to the detection of one or more RF Link Imbalances and/or the identification of the NodeB corresponding thereto, or alternatively, the data obtained from establishing these links can be saved (referred to as historical data) and post processed to achieve similar findings at a later time.

Conditions are created to assure that a single active RF link, including a single UL_Path and a single DL_Path, is defined between the UE and the NodeBs at 502. This can be done by only establishing RF Links in which the UE is not in Handover, or filtering historical data to retain only data for single links (by excluding those in Handover) suitable for determining the link imbalance as described herein. The links can be established using drive-by testing in which testers establish a EU-to-Network connection, such as those involving the R99 Voice Call described above, which includes different Active RF Links at different locations and times. This data can be filtered/sorted to provide the determinations described herein using the different Active RF Links as separate RF Links.

The method 500 also includes, at 504, determining the UE receive power levels (UE_Rx) defined as the CPICH_Rx Power and the UE transmit power levels (UE_Tx) for the RF Links from the UE side of the Air Interface, that is from measurements of the power levels taken at/from the UE. These power levels are typically measured in −dB.

The method 500 also includes, at 506, determining the sums ($Sum_{Rx+Tx}$) of the UE receive power levels (UE_Rx) and the UE transmit power levels (UE_Tx) for each of the RF Links established at 502.

The method 500 can also include collecting a set of one or more $Sum_{Rx+Tx}$ for each RF Link at 508. To improve data reliability/integrity, the UE_Rx and UE_Tx power levels for each RF Link can be measured multiple times. The granularity of automatic measurements from test tools is normally in the 10 ms-1 s range and as such collection of larger numbers of samples is often possible. Each pair of measured values are summed providing a corresponding $Sum_{Rx+Tx}$ value. The $Sum_{Rx+Tx}$ values are then collected into sets (of one or more $Sum_{Rx+Tx}$ values), each set corresponding to a separate RF Link.

The method also includes, at 510, determining, for each set, the Average ($AvgSum_{Tx+Rx}$) of the one or more $Sum_{Rx+Tx}$ values in the set, to provide a plurality of $AvgSum_{Tx+Rx}$ values, each corresponding to a different RF Link.

The method 500 also includes, at 512, identifying one or more RF Links having $AvgSum_{Tx+Rx}$ values, which significantly deviate from the $AvgSum_{Tx+Rx}$ values of the other RF Links, as having RF Link Imbalances.

It should be appreciated that the network will be considered as mostly operating within proper operating conditions, and thus, the "other RF Links" will typically be the majority the RF Links, which are operating under well balanced transmit and receive conditions. The RF Links with significant deviations can have $AvgSum_{Tx+Rx}$ values which are either higher or lower than the other RF Links. As shall be discussed in further detail in the example provided below, the imbalanced Links can be identified using thresholds including an upper threshold and a lower threshold. In one example which should not be considered limiting, the thresholds can be determined using the standard deviation $AvgSum_{Tx+Rx}$ values.

The method 500 also includes at 514, identifying the one or more Nodes (such as NodeBs) corresponding to the one or more RF Links identified at 510 as the one or more Nodes having an RF Link imbalance.

Figure 6:
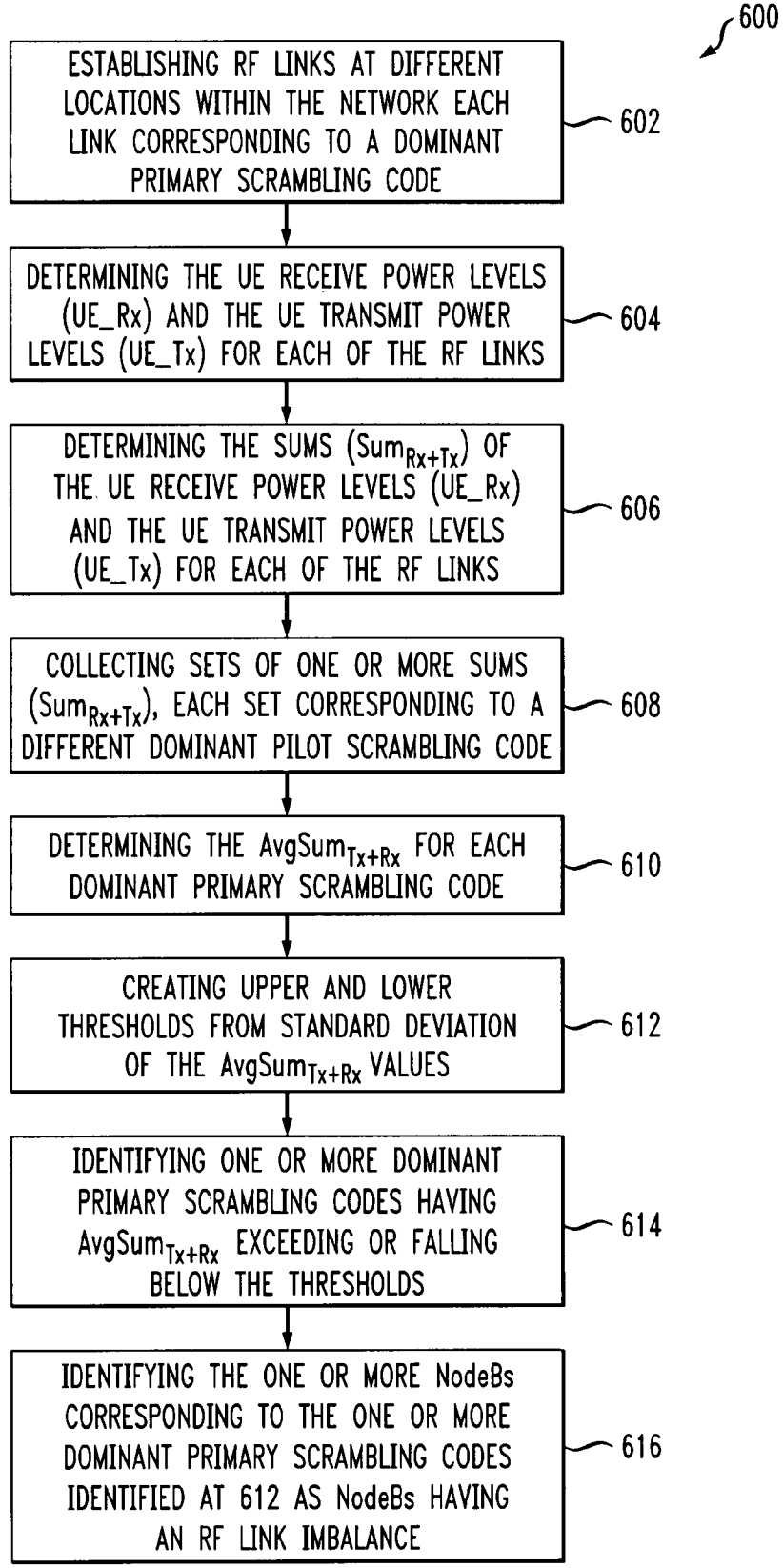
FIG. 6 is a flow chart illustrating an example embodiment of the method shown in FIG. 5.

Referring now to FIG. 6, an example implementation, which should not be considered as limiting, of the method 500 is shown generally at 600. RF Links were established at different locations within the network between a UE and NodeBs at 602 assuring that the UE was not in a Handover condition in a manner as described above. The UE receive power levels (UE_Rx) and the UE transmit power levels (UE_Tx) for the RF Links are determined at 604. These power level values are determined at the UE, such as by measuring them in a manner as described above. The $Sum_{Rx+Tx}$ of the UE_Rx and the UE_Tx for each of the RF Links is then determined at 606. The RF measurements/data points, are grouped according to their corresponding Pilot Scrambling Code, also referred to as CPICH Scrambling Code, at 608 and the $AvgSum_{Tx+Rx}$ for each group is determined at 610. The Scrambling Code can be the Primary Scrambling Code.

Referring now to FIG. 7, a plot of the Averages of the Sums ($AvgSum_{Tx+Rx}$) of the UE receive power levels (UE_Rx) and the UE transmit power levels (UE_Tx) for each group of RF Links corresponding to a Scrambling Code determined at 610 is shown generally at 700. The $AvgSum_{Tx+Rx}$ values are given in –dB, or dB down, and the groups are arranged in descending order of the magnitudes of these values for the purposes of clarity.

The standard deviation of the $AvgSum_{Tx+Rx}$ values was then determined and used as the upper threshold and the lower threshold at 610. These thresholds define a window which includes the $AvgSum_{Tx+Rx}$ values of the normally operating groups as described above. As shown in FIG. 7, the window, shown at 710 includes the high threshold value of approximately –99 dB, shown at 712, and the low threshold value of approximately –92 dB, shown at 714.

The three groups 720 at the left hand side of the plot 700 having $Sum_{Tx+Rx}$ values exceeding the upper threshold 712 can be said to be significantly deviating from the groups having $Sum_{Tx+Rx}$ values falling within the window 710 (the groups not having RF Link Imbalances). Similarly, the three groups 722 at the right hand side of the plot 700 having $Sum_{Tx+Rx}$ values below the lower threshold 714 can also be said to have significant deviations. These groups 720 and 722 can be identified as groups having RF Link Imbalances. As such, the NodeBs corresponding to these groups of Scrambling Codes can be identified as having RF Link Imbalances.

The processing of the collected data can provide an average of the set of (UE Tx+CPICH RX) measurements for a single link to an individual Sector of a NodeB; the Sector being identified with a unique Primary Scrambling Code. Data from sequential calls, or from additional data collection devices can be filtered and combined to build a group of measurements relating a single Sector. However, typically a single UE with a permanent Network connection via a R99 Voice Call is used for simplicity. In this case the measurement results are filtered to exclude data involving an Active Set size >1 (i.e. data when the UE is in Handover) and then averaged based on the set of data for a given recorded Primary Scrambling Code. This then gives the average of Tx+Rx for each Primary Scrambling Code monitored.

It is contemplated that the measurements of the UE_Rx power and UE_Tx power made at the UE can be transmitted to the wireless network 100, such as for example to the RNC, for the collection, grouping and processing necessary to detect the RF Link Imbalances in an automated manner. For example, the network can utilize the RF Call Trace, a feature allowing the Network to request the UE send measurement data to the Radio Network Controller. These measurements can include CPICH Scrambling Code, UE Tx power and UE_Rx power. The RNC also has access to the information regarding the number of Links in the Active Set, the CPICH_Tx power, the current SiR, and the Call type/US Spreading Factor.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for determining an RF Link Imbalance between an Uplink Path (UL Path) and a Downlink Path (DL Path) of an RF Link between a User Equipment (UE) and a NodeB in a 3G UMTS wireless network comprising: measuring Common Pilot CHannel (CPICH) Rx Power at a UE; determining the DL Path Loss from the UE side of the RF Link as CPICH_Tx_Power-CPICH Rx Power; determining the UL Path Loss from the UE side of the RF Link as UE Tx Power-NodeB Expected Rx Power; and determining RF Link Imbalance as UL Path Loss-DL Path Loss, wherein the step of determining the UL Path_Loss comprises estimating the NodeB_Expected Rx Power using the expected Noise Floor of the NodeB, the Receive Sensitivity of the NodeB on the Network side of the RF Link, the Processing Gain of a voice call, and the approximate target Signal to Interference ratio at the NodeB; and determining RF Link Imbalance as UL Path Loss-DL Path Loss.

2. The method defined in claim 1 wherein the step of determining the DL_Path_Loss further comprises obtaining CPICH_ Tx_Power from signaling to the UE.

3. The method defined in claim 1 wherein the step of estimating the NodeB_Expected_Rx_Power includes the summation of the values of the expected Noise Floor of the NodeB, the Processing Gain for a test call and the typical target Signal to Interference ratio.

4. A method of determining an RF link imbalance between an Uplink Path (UL_Path) and a Downlink Path (DL Path) of an RF Link between a User Equipment (UE) and a NodeB in a 3G UMTS wireless network comprising:
   establishing RF Links at different locations within the network, each RF link including an UL_Path and a DL_Path between a UE and one or more Nodes in a wireless network;
   determining the UE receive power levels (UE_Rx) and the UE transmit power levels (UE_Tx) for the RF Links;
   determining the sums ($Sum_{Rx+Tx}$) of UERx and UE_Tx for the RF Links;
   collecting sets of one or more $Sum_{Rx+Tx}$, each set corresponding to a different RF Link;
   determining the averages ($AvgSum_{Rx+Tx}$) of the $Sum_{Tx+Rx}$ values for each set;
   identifying one or more RF Links having $AvgSum_{Tx+Rx}$ values deviating from the $AvgSum_{Tx+Rx}$ values of other RF Links, as one or more RF Links having an RF Link imbalance.

5. The method defined in claim 4 wherein the identifying step further comprises:
   creating a high threshold value and a low threshold value; and
   identifying one or more RF Links having $AvgSum_{Tx+Rx}$ values exceeding the high threshold value or falling below the low threshold value.

6. The method defined in claim 5 wherein the high threshold value and the low threshold value are formed using the standard deviation of the $AvgSum_{Tx+Rx}$ values.

7. The method defined in claim 4 wherein the identifying step further comprises:
   displaying the $AvgSum_{Tx+Rx}$ values as plotted values; and
   marking the high threshold and low threshold on the plot for identifying one or more RF Links having $AvgSum_{Tx+Rx}$ values exceeding the high threshold value or falling below the low threshold value.

8. The method defined in claim 4 wherein the $AvgSum_{Tx+Rx}$ values each correspond to a different Scrambling Code.

9. The method defined in claim 4 wherein the RF Links each correspond to a different sector of a NodeB.

10. The method defined in claim 4 wherein the establishing step further comprises filtering data for measurements corresponding to single RF links existing in an Active Set.

11. The method defined in claim 4 wherein the one or more Nodes are one or more NodeBs in a 3G UMTS wireless network.

12. The method defined in claim 4 wherein the step of determining the UE_Rx and UE_Tx includes determining the UE_Rx and UE_Tx at the UE side of the RF Links.

13. The method defined in claim 4 wherein the RF Links established in the step of establishing RF Links at different locations within the network do not include RF Links in Handover.

14. The method defined in claim 4 further comprising collecting UE_Rx power level values and UE_Tx power level values from one or more UEs at one or more network nodes via an RF Call Trace command and the identifying step being performed by the network.

15. The method defined in claim 14 wherein a Radio Network Controller collects the UE_Rx power level values and UE_Tx power level values and detects the one or more RF Link Imbalances in the identifying step.

16. A method of determining one or more Nodes having an RF link imbalance between an Uplink Path (UL_Path) and a Downlink Path DL Path) of an RF Link between the one or more Nodes and User Equipment (UE) in a wireless communications network comprising:
   establishing RF Links at different locations within the network, each RF link including an UL_Path and a DL_Path between a UE and a Node in a wireless network;
   determining the Averages of the Sums ($AvgSum_{Tx+Rx}$) of the UE receive power levels (UE_Rx) and the UE transmit power levels (UE_Tx) for a plurality of RF Links corresponding to a Scrambling Code;
   determining a plurality of $AvgSum_{Tx+Rx}$ each corresponding a different one of a plurality of Scrambling Codes in the network;
   determining a window having a high threshold value and a low threshold value;
   identifying one or more $AvgSum_{Tx+Rx}$ having values falling outside the window; and
   identifying one or more Nodes corresponding to the one or more $AvgSum_{Tx+Rx}$ having values falling outside the window as the one or more Nodes having an RF Link imbalance.

* * * * *